United States Patent [19]

Long

[11] Patent Number: 5,299,414
[45] Date of Patent: Apr. 5, 1994

[54] MULCHING LAWN MOWER BLADE AND HOUSING ASSEMBLY

[75] Inventor: Charles K. Long, Seneca, S.C.

[73] Assignee: Ryobi Motor Products Corp., Easley, S.C.

[21] Appl. No.: 920,140

[22] Filed: Jul. 24, 1992

[51] Int. Cl.$^5$ .................. A01D 34/08; A01D 34/73; A01D 34/78; A01D 67/00

[52] U.S. Cl. ...................... 56/17.4; 56/17.5; 56/295; 56/320.1

[58] Field of Search .............. 56/11.9, 17.4, 17.5, 56/255, 295, 320.1, 320.2

[56] References Cited

U.S. PATENT DOCUMENTS

| | | | |
|---|---|---|---|
| 2,578,880 | 12/1951 | Doyle | 56/320.2 X |
| 2,697,323 | 12/1954 | Horn | 56/295 |
| 3,085,386 | 4/1963 | Slemmons | |
| 3,212,244 | 10/1965 | Wilgus | 56/320.1 X |
| 3,910,017 | 10/1975 | Thorud et al. | 56/295 |
| 4,189,903 | 2/1980 | Jackson et al. | 56/255 |
| 4,318,903 | 3/1982 | Szymanis | 56/255 |
| 4,951,449 | 8/1990 | Thorud | 56/17.5 X |
| 5,117,616 | 6/1992 | McLane | 56/320.2 X |
| 5,184,451 | 2/1993 | Savipakka et al. | 56/320.1 X |

Primary Examiner—George A. Suchfield
Attorney, Agent, or Firm—Brooks & Kushman

[57] ABSTRACT

A rotary mulching lawn mower is provided having an annular housing forming a toroidal internal cutting chamber in which is oriented a blade having a central axis for rotation. The blade has a series of blade portions extending radially outward from the central axis each having an end portion extending into the toroidal internal cutting chamber. The blade end portion directs cut grass upward into the cutting chamber. Each blade has an intermediate portion located between the central axis and the end portion having a substantially flat surface lying in a plane generally perpendicular to the axis of rotation. The intermediate portion is provided with a radially extending rib located intermediate the leading and trailing edge portions of the blade having a slope projecting downwardly out of the plane for directing cut grass into the lawn upon rotation of the blade. The lawn mower of the preferred embodiment is driven by a battery powered electric motor.

31 Claims, 2 Drawing Sheets

MULCHING LAWN MOWER BLADE AND HOUSING ASSEMBLY

TECHNICAL FIELD

This invention relates in general to machines for mulching grass. More particularly, this invention relates to rotary type lawn mower cutting elements which are rotated in a horizontal cutting plane for severing grass at a predetermined height above the ground. Still further, it relates to lawn mower cutting elements of the above type, where the prime motive source is an electric motor.

BACKGROUND OF THE INVENTION

Motorized lawn mowers of various types are well known for cutting grass or similar vegetation. These motorized lawn mowers generally include a housing having a cutting chamber, a rotatable cutting blade which is rotated in the cutting chamber and some type of motive means for effecting rotation of the cutting blade. Typical lawn mowers have been designed to incorporate one or more grass discharge ports where the cut grass is discharged by the operation of the cutting blade. The grass clippings are then deposited on the lawn and raking or gathering up the clippings is necessary when the grass is long. Alternatively, a bag attachment can be connected to the discharge port to collect the grass as it is discharged from the lawn mower.

As an alternative to clipping discharge and bagging chute type lawn mowers, numerous types of mulching lawn mowers are disclosed in the prior art that do not require bagging or raking of the grass clippings. These chuteless lawn mowers cut the grass clippings to a fine mulch which is deposited directly onto the lawn.

It is ecologically advantageous to deposit the mulched grass particles onto the lawn because they are a good nutrient source for the uncut grass. The grass particles decompose quickly and do not contribute to a build up of thatch as much as do longer length non-mulched clippings. Non-mulched clippings are often bagged and transported to landfills, contributing to the already significant solid waste disposal problems of landfills.

Prior art mulching mowers utilize various systems for initially cutting and recutting the grass clippings. Some systems utilize a toroidal chamber with a cutting blade that creates an air current for moving the cut grass clippings within the cutting chamber. The grass clippings are cut a plurality of times by the cutting blade before being deposited onto the grass. Other systems such as disclosed in U.S. Pat. No. 4,951,449 to Thorud utilize a plurality of planar members which are disposed along the inner wall of the cutting chamber. These planar members or "kickers" are utilized to deflect the grass clippings down into the direction and through the cutting plane. The blade subsequently directs the grass clippings onto the lawn. Still further, other systems utilize cutting elements with a plurality of cutting blades or members which increase the cutting action of the cutting element.

Regardless of the mulching system used in the prior art, it should be noted that the retention of grass clippings within the cutting chamber, and the requirement for these grass clippings to be cut a plurality of times in the mulching process, imposes a greater load on the motive source driving the blade than does a comparable non-mulching lawn mower. Thus, mulching lawn mowers utilizing electric motors as the prime motive source are subject to unique problems because they have comparably lesser horsepower outputs than mulching lawn mowers utilizing internal combustion engines.

Non-mulching chute type mowers generally have a tangential passage of air that exits the discharge chute located on the housing. In contrast, chuteless mulching mowers have less internal air current created inside the cutting chamber and are thus incapable of dissipating heat as easily as chute type non-mulching mowers.

Thus it becomes apparent that mulching mower designs that utilize electric motors as the prime motive source for rotating the cutting element must be concerned with special problems associated with electric motors. The overall drag that the cutting element produces in operation is of primary concern. Prior art mulching blade designs often include foil members or sail members that are utilized to create upward air currents within the cutting chambers of the mulching mowers. These air currents are utilized to disburse and circulate the grass clippings throughout the cutting chamber to facilitate movement of the clippings which must be recut a number of times before being deposited on the grass.

Conventional mulching blades are described in U.S. Pat. No. 3,085,386 issued to Slemmons and U.S. Pat. No. 4,189,903 to Jackson, et al. The utilization of large air foil or sail members on mulching mower blades requires increased horsepower to drive the blade as compared to regular lawn mower blades. The air resistance needed to create the air current for moving the clippings requires increased horsepower to rotate the blade.

An electric mulching mower is described in U.S. Pat. No. 4,318,268 issued to Szymanis. The Szymanis patent discloses a chuteless rotary mulching lawn mower powered by an electric motor including a toroidal cutting chamber bounded by a concentric skirt wall. The mulching mower blade disclosed in Szymanis includes an upwardly twisting portion for creating an upward air flow during rotation of the blade. The Szymanis mulching blade further includes a downwardly twisted portion for creating a downward air flow for pulling grass clippings down through the cutting plan and onto the grass.

The Szymanis application refers to electric mulching mowers utilizing electric motors. The Szymanis reference fails to address the significant obstacles posed in designing a battery powered electric mulching mower. Horsepower requirements of mulching mowers have in the past precluded implementation of battery powered mulching mowers because of the size and weight characteristics of the attendant battery power sources relative to the electrical energy requirements of mulching mowers. Battery sources possessing the electrical energy storage capacity large enough to supply continuous energy to an electric mulching mower during operation in mulching an average lawn size were often too large and too heavy for realistic consumer use.

SUMMARY OF THE INVENTION

Accordingly, the lawn mower of the present invention is provided with a cutting blade having an end portion for cutting the grass and creating an upward airflow upon rotation of the blade and an intermediate portion having a leading edge and a trailing edge lying in a plane generally perpendicular to the axis of blade rotation. The blade is integrally formed with an elongated rib projecting downwardly from the blade. The elongated rib serves as a deflector forcing the cut grass in the direction of the lawn upon rotation of the blade.

It is therefore an object of the present invention to provide a new and improved cutting blade for an electric mulching mower which is capable of adequately mulching cut grass using an electric motor as the prime motive source.

It is a further object of the present invention to provide a new and improved mulching blade for a battery powered electric mulching mower capable of adequately mulching cut grass and extending the overall cutting time of the battery powered mower by reducing the horsepower requirements needed to drive the mulching blade.

It is a still further object of the present invention to provide a new and improved mulching blade which is capable of creating an air current within the cutting chamber that forces the cut grass down through the cutting plane and onto the lawn.

It is an even further object of the present invention to provide a new and improved mulching blade and housing configuration that produces an air current that forces the grass clippings onto the ground and does not create a large drag or load on an electric motive source.

Still yet another object of the present invention is to provide a new and improved mulching blade and housing configuration wherein a mulching blade has a relatively short end portion for creating an end current that forces the grass clippings upwardly and inwardly within a toroidal cutting chamber and an intermediate portion drawing the grass clippings down into the cutting plane.

Yet another object of the present invention is to provide a new improved mulching blade and housing configuration wherein an elongate rib is disposed along an intermediate portion of the cutting blade and is used to draw grass clippings down onto the lawn and is also utilized to strengthen the blade thereby allowing use of a thinner gauge material which minimizes the horsepower required to drive the blade.

Other features and advantages of the invention will be set forth in, or apparent from, the detailed description of preferred embodiments of the invention which follows.

BEST MODE FOR CARRYING OUT THE INVENTION

Figure 1:
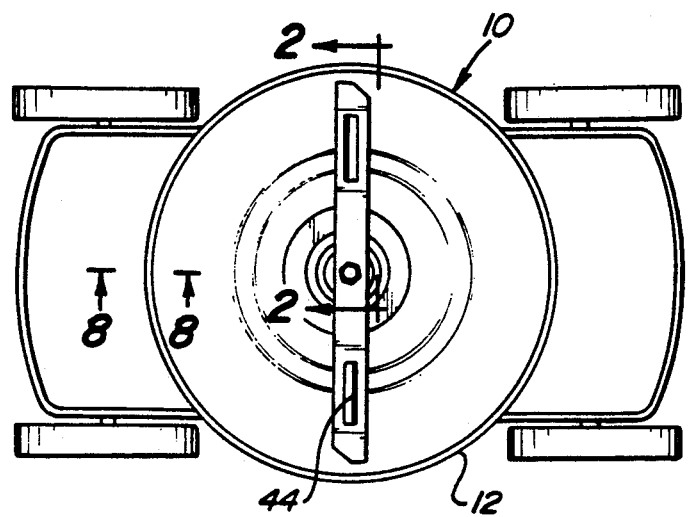
FIG. 1 is a plan view of the obverse side of a mulching lawn mower constructed in accordance with the present invention.
Figure 2:
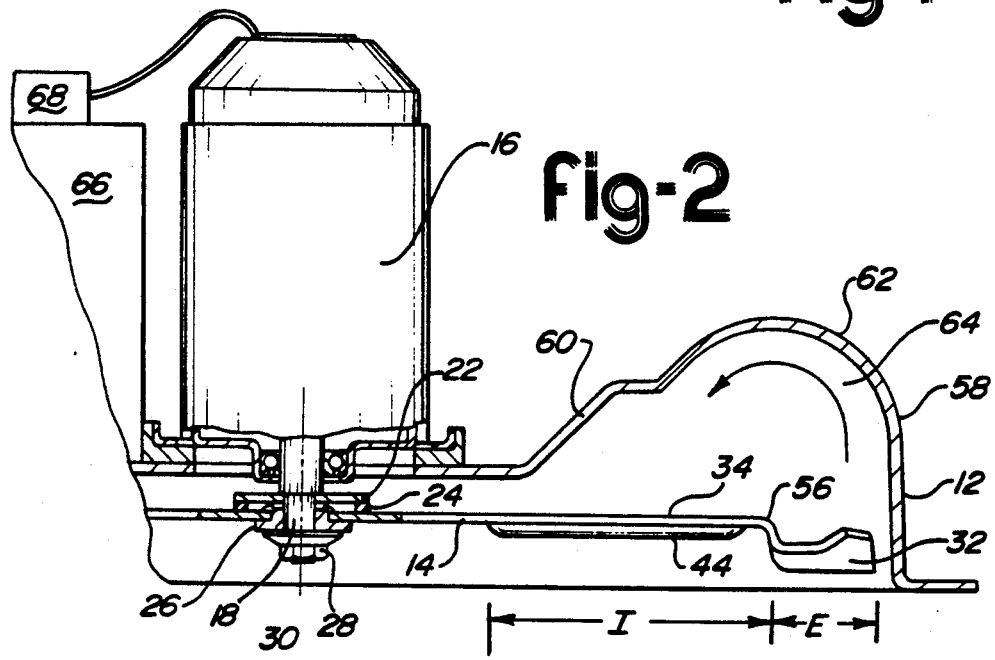
FIG. 2 is a partial cross sections view along section 2—2 of FIG. 1.

Referring now to FIG. 1, a lawn mower is indicated generally by the reference numeral 10. The lawn mower 10 comprises a housing 12, a cutting blade 14, and a motive source for rotating the cutting blade. The preferred embodiment of the present invention utilizes an electric motor and a battery power source. FIG. 2 shows an electric motor 16 disposed above the housing 12 and a battery 66 and a switch 68. A drive shaft 18 extends down from electric motor 16 and extends through aperture 20 of cutting blade 14. As shown in FIG. 2 an index washer 22 is positioned above a blade spacer 24 which is disposed above cutting blade 14. Cutting blade 14 is affixed to drive shaft 18 by the use of blade retainer 26 and nut 28.

Figure 5:
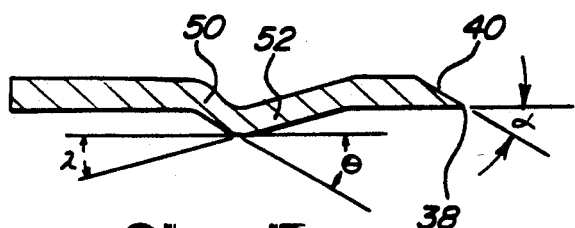
FIGS. 5 and 6 are views along sections 5—5 and 6—6 of FIG. 3.

The cutting blade of the present invention has an axis of rotation designated by reference numeral 30 as shown in FIG. 2. Cutting blade 14 is symmetrical in configuration about its center "C". The direction of rotation of the blade in operation is shown by the arrow "D" in FIG. 3. The cutting blade 14 includes an end portion 32 and an intermediate portion 34. The length of end portion 32 is represented by "E" in FIGS. 2 and 3. End portion 32 has a bevel 36 which forms a cutting edge 38. Intermediate portion 34 has a bevel 40 which form a cutting edge 42. As shown in FIG. 5, the angle $\alpha$ of bevels 36 and 40 is preferably within the range of about 25° to 35°, with the preferred embodiment using an angle $\alpha$ of 30°.

In operation the cutting blade is rotated by the motive source with most of the cutting action occurring at the end portion 32. Cutting edge 38 initially cuts the grass as it comes under housing 12. Blade 14 has a thickness ranging preferably from about 0.125 to 0.145 inches and is formed of a cold rolled steel SAE Grade 10B38.

Figure 3:
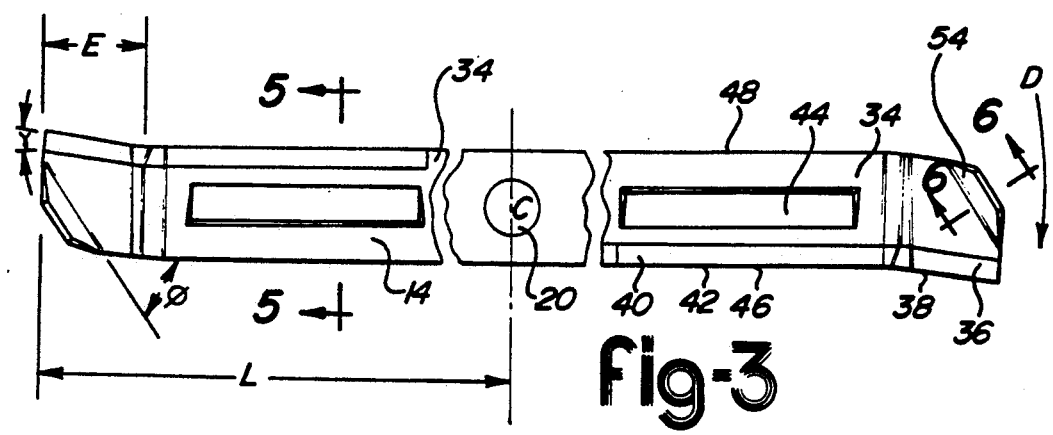
FIG. 3 is a top plan view of a cutting blade of the present invention.
Figure 6:
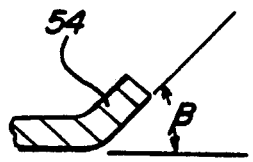

A rib 44 is located intermediate leading edge 46 and trailing edge 48 of intermediate portion 34. Elongate rib 44 has a first inclined surface 50 and a second inclined surface 52 as shown in FIG. 5, and described in more detail below. A sail member 54 is disposed opposite the intermediate portion on the end portion 32 of the blade 14 as shown in FIG. 3. Sail member 54 is formed by bending the rearward corner of the blade upward along a fold line oriented at an angle $\phi$ relative to the blade trailing edge, where $\phi$ is approximately 45°. Referring to FIG. 6, sail member 54 is disposed on end portion 32 such that angle $\beta$ is in a range of about 40° to 50° with the preferred embodiment having an angle $\beta$ of 45°. End portion 32 of cutting blade 14 is offset from intermediate portion 34 as shown in FIG. 3, by angle $\gamma$. Angle $\gamma$ is in a range of about 7° to 12° with the preferred embodiment having an angle of 10°. Sail member 54 is beneficial in providing an increased lift for the grass clippings. It should be appreciated, however, that the blade can be fabricated without a sail member. When the sail member is omitted, lift and mulching efficiency is reduced slightly, however, cutting time for a given motor size and battery capacity is extended due to the lower drag.

Figure 4:
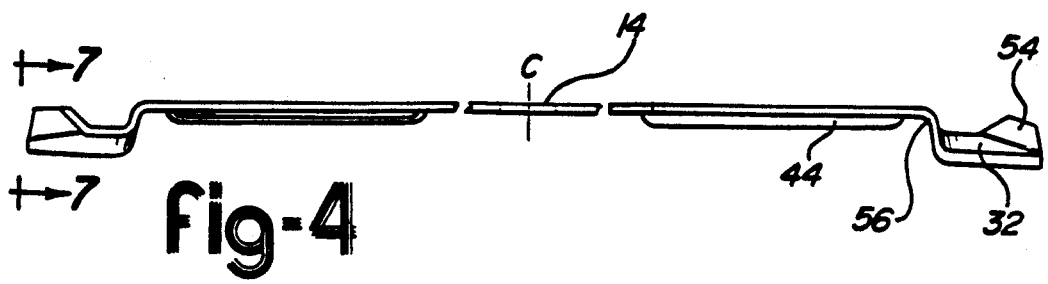
FIG. 4 is a side elevational view of the cutting blade of FIG. 3.
Figure 7:
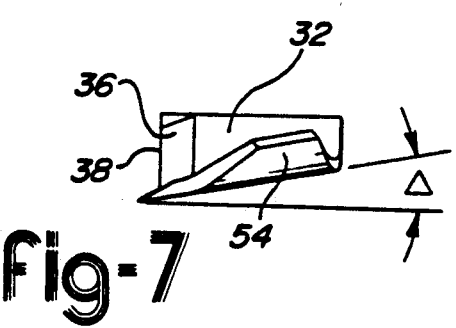
FIG. 7 is a fragmentary end view of the cutting blade of the present invention taken along section 7—7 of FIG. 4.

The specific configuration of the cutting blade of the present invention greatly reduces the drag or load put on the motive source used to rotate the blade but still operates effectively as a mulching blade. In the preferred embodiment of the present invention, as shown in FIGS. 3 and 4, end portion 32 is angled up from the plane of rotation of the blade approximately 10° as represented by angle "Δ" in FIG. 7. Angle Δ of end portion 32 creates an upward air flow upon rotation of the blade and thus directs grass cut initially by cutting edge 26 up into the top portion of the cutting chamber. In the preferred embodiment of the present invention, angle γ is in a range of about 8° to 10°.

The present invention, in operation, draws grass clippings down and into the cutting edge 38 located on intermediate portion 34 by a downward air flow created by rib 44. Upon rotation of blade 14, rib 44 creates a downward air flow as represented by the arrows shown in FIG. 2. This downward air flow directs the upwardly, inwardly directed grass clippings down through the cutting path a second time to be recut by cutting edge 38. The combination of the upward, inward air flow created by the end portion 32 and sail member 54 and the downward air flow created by rib 44 facilitates an inward toroidal current of air and grass clippings that effectuates the actual recutting and deposition or "mulching" of the grass clippings.

In contrast to mulching mower blades of the prior art, the mulching mower blade of the present invention is a low profile blade which creates comparably less drag or load on the motive source driving the blade. This is particularly important when the motive source is an electric motor with limited horse power ranges and even more significant when the electric motor is powered by an onboard battery power source.

As discussed above, mulching mowers in general require more horsepower than standard discharge mowers because of the added requirements of circulating and recutting the grass clippings before deposition of the grass onto the lawn. This requirement for more horsepower poses significant problems for electric mulching mower systems and even more significant obstacles for battery powered electric mulching mowers. The present invention overcomes these obstacles by the use of a low profile mulching mower blade that effectively mulches cut grass while reducing the load requirements necessarily required of the motive source utilized to drive the cutting element. In addition, the mulching mower blade of the present invention is configured with an elongate rib that not only functions as a grass deflecting member upon rotation of the blade, but acts to strengthen the blade structurally. This structural reinforcement extends to the overall useful life of the mulching blade.

In the preferred embodiment of the mulching blade shown in FIGS. 3 and 4, the length "E" of end portion 32 is approximately 17% of the length "L" of blade. A range of about 15% to 20% has been found to be effective in mulching the grass clippings while keeping relative drag on the cutting blade to a minimum. This relatively small percentage of the overall blade devoted to facilitation of the upward, inward air currents needed for the mulching process translates to a correspondingly small amount of surface area disposed tangentially to the plane of rotation of the cutting blade. This small tangential surface area is advantageous in decreasing air resistance or drag upon rotation of the blade and adds to the low profile characteristic of the mulching blade of the present invention.

Mulching blades of the prior art disclose sail members or air foil portions that range from ¼ to ½ of the overall blade length. In addition, the sharply down-turned transitional portion of the blade 56 disposed between intermediate portion 34 and end portion 32 shown in FIG. 4, adds to the overall low profile characteristics of the present invention. This sharply downturned transitional portion 56 creates less drag when the blade is rotated than a longer transitional portion.

Elongate rib 44 extends down from intermediate portion 34 and creates a downward air flow upon rotation of the blade that pulls the grass clippings through the recutting plane again and directs the grass clippings onto the lawn. Elongate rib 44 is comprised of first inclined section 50 and second inclined section 52. The angles of inclination of first inclined section 50 and second inclined section 52 are configured such that drag is reduced on the motive source upon rotation of the blade. The overall surface area on rib 44 tangential to the plane of rotation is relatively minimal as compared to prior art blade configurations with downward air flow creating members. Elongate rib 44 extends on approximately 40-45% of the overall length of the blade to create a sufficient downflow upon rotation of the blade. The preferred embodiment of the present invention shown in FIG. 3 includes an elongate rib 44 which extends on 42% of the overall length of the blade.

In the preferred embodiment of the present invention, first inclined section 50 is disposed at an inclination angle $\theta$ to the cutting plane less than inclination angle $\lambda$ of second inclined section 52 as shown in FIG. 5. The preferred embodiment of the present invention utilizes an inclination angle $\theta$ from the plane of rotation of the blade of 15°. Inclination angle $\lambda$ of the second inclined surface from the plane of rotation is 50°.

The low profile elements of elongate rib 44 are in direct contrast to prior art members that were used for creating a downward air flow. Prior art blade designs contained extending members for creating a sufficient downward air flow to drag the grass clippings through the recutting plane a second time but were not concerned with the relative horsepower requirements created by the blades on the motive sources. Internal combustion engines typically had an abundance of horsepower to drive the blade.

In addition to the low profile characteristics of elongate rib 44, rib 44 works to structurally strengthen cutting blade 14 reducing incidence of fracturing of the blade in use. Because of this strengthening feature, the gauge of the material used to manufacture the blade can be lessened. Manufacturing cutting blade 14 of a thinner gauge thus works to further reduce the load put an electric motor source that can be used to rotate the blade.

FIG. 2 shows a preferred embodiment of the present invention with the housing 12 disposed above cutting blade 14. Housing 12 has an annular outer top wall portion 58 and a centrally disposed sloped inner top wall portion 60. Annular top wall portion 58 has an upwardly extending arcuate cross-section 62. Sloped top wall portion 60 cooperates with annular top wall portion 58 to form a toroidal internal cutting chamber 64.

Figure 8:
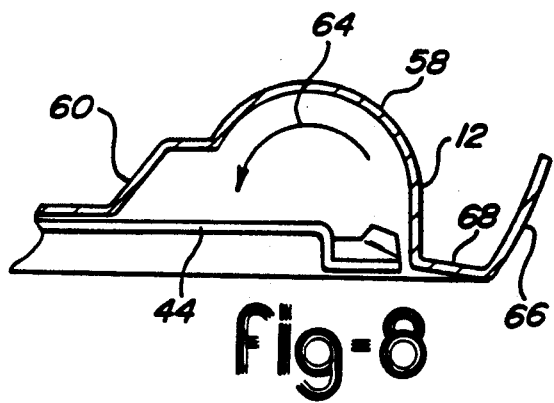
FIG. 8 is a partial cross section view along section 8—8 of FIG. 1.

FIG. 8 shows a preferred embodiment of housing 12 having an extending curved portion 66 and a connecting portion 68. Extending curved portion 66 contacts the grass initially and acts to bend the grass prior to introduction into toroidal cutting chamber 64. The grass passes under connecting portion 68 and straightens momentarily before being cut by cutting edge 38 of end portion 32.

End portion 32 of cutting blade 14 is disposed below inner top wall portion 60. End portion 32 directs the grass clipping upwardly and inwardly toward annular top wall portion 58 as shown in FIG. 2. Intermediate portion 34 is disposed below inner top sloped wall portion 60. As the grass is moved in an upwardly, inwardly direction within the toroidal cutting chamber 48, the clippings are drawn down through the cutting path of the rotating blade 12 and pushed onto the lawn by elongate rib 44 as shown in FIG. 2. The direction of the grass clippings and air currents is represented by the direction of the arrows shown in FIG. 2, within toroidal cutting chamber 64. The combination of the cutting blade 14 and the toroidal cutting chamber 64 configured as in the present invention creates internal toroidal air currents that carry the grass clippings through the mulching process.

The cutting blade and toroidal cutting chamber, in combination, work to reduce the overall load imposed on the motive during the mulching process. Annular outer top wall portion 58 and inner sloped top wall portion 60 act as deflectors or fixtures for the cut grass clippings to contact and rebound off from as the toroidal internal cutting chamber air currents created by the rotation of the mulching mower blade transport and direct the grass clippings through the mulching process. This again further reduces the horsepower requirements of the motive source, and in the case of a battery powered electric mulching mower, extends the cutting time of the mower.

Referring to FIG. 2, the preferred embodiment of the present invention utilizes a battery 66 and a switch 68 to energize electric motor 16. As stated previously, configuration of the mulching blade 14 and the housing 12 act to reduce the overall load on the electric motor 16 in operation. Electric motor 16 is a permanent magnet 24 volt DC motor having a maximum output falling within the range of 1 to 2 horsepower and most preferably, 1.5 horsepower. The operation of the motor is controlled by a conventional on/off relay type switch which also serves as a blade break as is well known in the art. Battery 66 is preferably the sealed lead acid type commonly used in the industry today. The battery energy storage capacity is preferably within the range of 10 to 20 amp powers and most preferably 15 amp powers. The high efficiency mulching blade designed in the present invention enables a relatively small battery to be utilized for a given blade diameter and mower operating time.

The reduction in overall load that the electric motor 16 is subjected to allows for extended cutting time utilizing a battery source. The extension of operational cutting time enlarges the overall commercial market for the mulching mower of the present invention. Consumers with lawns of various areas can utilize the mower of the present invention with less concern for the eventual exhaustion of battery power used to operate the mower. The mulching mower of the present invention equipped with an 18" blade, is capable of cutting the lawn of a house situated on a half acre lot on a single battery charge provided the grass is not wet and is not excessively long. Mulching mowers of the present invention having a high efficiency blade can cut the vast majority of typical lawns on a single battery charge making battery operated lawn mowers practical in many situations where gasoline powered lawn mowers are the only practical previous lawn cutting alternative.

While this invention has been described in detail with particular reference to preferred embodiments thereof, it will be understood that variations and modifications can be effected within the spirit and scope of the invention as described and defined in the appended claims.

What is claimed is:

1. A cutting blade for use in a rotary mulching lawn mower wherein the blade is adapted for rotation about an axis of rotation generally perpendicular to the lawn for cutting grass or the like such blade comprising:
   a plurality of blade portions extending radially from said axis, each blade portion having an end portion, said end portion having means for cutting grass and means for generating an upward air flow directing the cut grass in a direction away from the lawn upon rotation of the blade; and
   an intermediate portion between the axis of rotation of said blade and said end portion, said intermediate portion lying in a plane of rotation generally perpendicular to the axis of rotation of said cutting blade, said intermediate portion having a leading edge and a trailing edge substantially in said plane of rotation and a radially extending rib projecting downwardly out of said plane of rotation intermediate said leading and trailing edges, said rib forming a deflector directing the cut grass in a direction towards said lawn upon rotation of the blade.

2. The cutting blade of claim 1 wherein said leading edge has a bevel forming a cutting edge for recutting grass, said cutting edge extending along the radial extension of said intermediate portion.

3. The cutting blade of claim 1 wherein said rib is an integral part of said intermediate portion.

4. The cutting blade of claim 1 wherein said rib strengthens said intermediate portion of said blade.

5. The cutting blade of claim 1 wherein said end portion is shorter than said rib.

6. The cutting blade of claim 1 wherein the length of said end portion is about 17% of the length of said blade portion.

7. The cutting blade of claim 1 wherein the length of said rib is about 42% of the length of said blade portion length.

8. The cutting blade of claim 1 wherein said rib has a first inclined surface extending towards said leading edge and a second inclined surface extending towards said trailing edge, and the inclination of said first inclined surface to the plane of said intermediate portion is less than the inclination of said second inclined surface thereto.

9. The cutting blade of claim 8 wherein the inclination of said first inclined surface from said plane of rotation is about 15°.

10. The cutting blade of claim 8 wherein the inclination of said second inclined surface to said plane of rotation is about 50°.

11. The cutting blade of claim 1 wherein said end portion comprises a surface angled about 10° from the plane of said intermediate portion in a direction to generate said upward air flow.

12. The cutting blade of claim 11 wherein said end portion includes a sail member disposed at the end of said surface opposite said intermediate portion, said sail member upwardly inclined from said surface at an angle of about 45°.

13. In a rotary mulching lawn mower, the combination comprising:
   a housing having an annular outer top wall portion and a centrally disposed sloped inner top wall portion, said annular top wall portion having an upwardly extending arcuate cross-section, said sloped top wall portion cooperating with said annular top wall portion to form a toroidal internal cutting chamber; and a blade having a central axis of rotation, said blade comprising a plurality of blade portions rotatable in said internal cutting chamber about said central axis of rotation of said blade, each blade portion having an end portion disposed below said annular top wall portion, said end portion having means for cutting the grass and means for directing the cut grass into said annular top wall portion in an upwardly and inwardly direction upon rotation of said blade, and each blade portion further having an intermediate portion located between said central axis of rotation of said blade and said end portion;

said intermediate portion having a substantially flat surface lying in a plane generally perpendicular to said axis of rotation of said blade, said intermediate portion having a leading edge and a trailing edge in said plane; and said intermediate portion further having a radially extending rib disposed intermediate said leading edge and said trailing edge, said rib having a sloped wall portion projecting downwardly out of said plane to form a deflector directing the inwardly directed cut grass from said toroidal internal cutting chamber towards said lawn upon rotation of the blade.

14. The combination set forth in claim 13 wherein said leading edge has a bevel forming a cutting edge for recutting grass, said cutting edge extending along the radial extension of said intermediate portion.

15. The combination set forth in claim 13 wherein said rib is an integral part of said intermediate portion.

16. The combination set forth in claim 13 wherein said rib strengthens said intermediate portion of said blade.

17. The combination set forth in claim 13 wherein said rib includes a first inclined surface extending toward said leading edge and a second inclined surface extending toward said trailing edge, said inclination of said first inclined surface to the plane of said intermediate portion is less than the inclination of said inclined surface.

18. The combination set forth in claim 13 wherein the inclination of said first inclined surface from said plane of rotation is about 15°.

19. The combination set forth in claim 13 wherein the inclination of said second inclined surface to said plane of rotation is about 50°.

20. The combination set forth in claim 13 wherein said end portion comprises a surface angled about 10° from the plane of said intermediate portion in a direction to generate an upward air flow for directing the cut grass into said annular top wall portion.

21. The combination set forth in claim 13 wherein said end portion includes a sail member disposed at the end of said surface opposite said intermediate portion, said sail member upwardly inclined from said surface at an angle of about 45°.

22. The combination set forth in claim 13 wherein said blade is driven by an electric motor.

23. The combination set forth in claim 22 wherein said electric motor is energized by a battery power source.

24. A mulching lawn mower for cutting grass comprising:

an electric motor having a drive shaft;

a battery power source for energizing said electric motor;

a housing for supporting aid electric motor having a toroidal internal cutting chamber;

a cutting blade having a central axis of rotation, said blade affixed to said drive shaft for cutting said grass and comprising a plurality of blade portions rotatable in said toroidal internal cutting chamber about said central axis of rotation of said blade, each blade portion having an end portion disposed within said toroidal internal cutting chamber, said end portion having means for cutting the grass and means for directing the cut grass in an upward and inward direction upon rotation of said blade, and each blade portion further having an intermediate portion located between said central axis of rotation of said blade and said end portion;

said intermediate portion having a leading edge and a trailing edge; and said intermediate portion further having a radially extending rib disposed intermediate said leading edge and said trailing edge wherein said intermediate portion is a substantially flat surface lying in a plane generally perpendicular to said axis of rotation of said blade, said rib projecting downwardly out of said plane to form a deflector directing the inwardly directed cut grass from said toroidal internal cutting chamber toward said lawn upon rotation of said blade.

25. A mulching lawn mower of claim 24 wherein electric motor is a permanent magnet DC motor having an output within the range of one to two horsepower.

26. A mulching lawn mower of claim 25 wherein the battery power source is a rechargeable battery having an energy storing rating in amp-hours between 8 to 12 times the motor horsepower rating.

27. A mulching lawn mower of claim 24 wherein said housing further comprises an outer top wall portion and an inner top wall portion cooperating to form said toroidal internal cutting chamber.

28. The mulching lawn mower of claim 24 wherein said end portion comprises a surface angled about 10° from the plane of said intermediate portion in a direction to generate said upward air flow.

29. A mulching lawn mower of claim 28 wherein said end portion includes a sail member disposed at the end of said surface opposite said intermediate portion, said sail member upwardly inclined from said surface at an angle of about 45°.

30. A mulching lawn mower for cutting grass comprising:

a DC electric motor having a generally vertical drive shaft;

a battery power source for energizing said electric motor;

a housing for supporting said electric motor, said housing defining a toroidal internal cutting chamber concentric with said drive shaft and having an arcuate top wall portion and a centrally disposed downward inwardly sloped inner wall portion;

a cutting blade having a central axis of rotation, said blade affixed to said drive shaft for cutting said grass and having a plurality of blade portions rotatable within said toroidal internal cutting chamber about said central axis, each blade portion having an end portion disposed within said toroidal internal cutting chamber, said end portion having a sharpened leading edge for cutting the grass and a sail member for directing the cut grass in an upward and inward direction toward said annular top wall portion and said centrally disposed sloped inner wall portion upon rotation of said blade, each blade portion further having an intermediate portion located between said central axis of rotation of said blade and said end portion;

said intermediate portion having a sharpened leading edge, a trailing edge, and a radially extending deflector, wherein said cut grass is directed by said arcuate top wall portion and said sloped inner wall portion towards said deflector wherein said deflector further directs the cut grass from said toroidal internal cutting chamber toward said lawn upon rotation of said blade.

31. A mulching mower for cutting grass as in claim 30 wherein said deflector is a rib disposed intermediate said leading and trailing edge.

* * * * *